E. L. Perry & C. Manheim.
Rubber Hose.

N°. 92,353.　　　Patented Jul. 6. 1869.

WITNESSES
Alex. F. Roberts
Wm. F. Clark

INVENTORS
E. L. Perry
C. Manheim
pr. Munn & Co
Attorneys.

United States Patent Office.

EDWARD L. PERRY AND CHARLES MANHEIM, OF NEW YORK, N. Y.

Letters Patent No. 92,353, dated July 6, 1869.

---

IMPROVEMENT IN THE MANUFACTURE OF RUBBER OR GUTTA-PERCHA HOSE.

---

The Schedule referred to in these Letters Patent and making part of the same.

---

*To all whom it may concern:*

Be it known that we, EDWARD L. PERRY and CHARLES MANHEIM, of the city, county, and State of New York, have invented a new and useful Improvement in Rubber or Gutta-Percha Hose; and we do hereby declare that the following is a full, clear, and exact description thereof, which will enable others skilled in the art to make and use the same, reference being had to the accompanying drawings, forming part of this specification.

The object of this invention is to provide rubber hose, so protected at the ends as to prevent the canvas from exposure to water or air, which, when so exposed, as it is now constructed, takes up the water by capillary attraction, and retains it to such an extent, that the ends of the hose soon become weak and rotten, and burst by the pressure of the water.

Similar letters of reference indicate corresponding parts.

Figure 1:
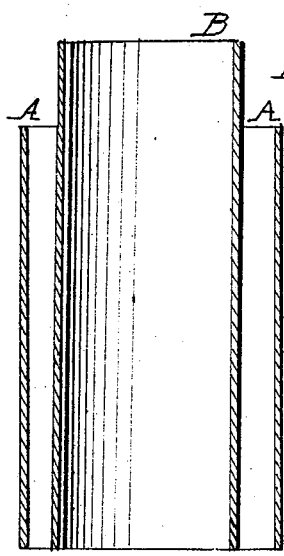
Figure 1 represents a section of an end, previous to finishing, when constructed according to our improvement.
Figure 3:
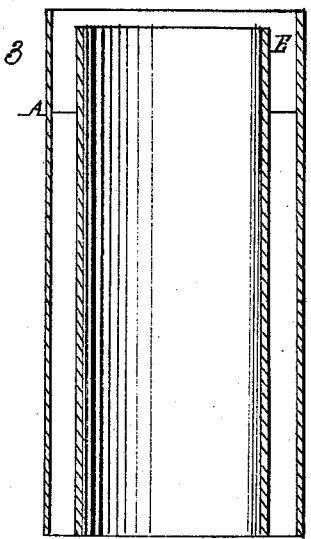
Figure 3 represents an end section, under a modified arrangement.
Figure 2:
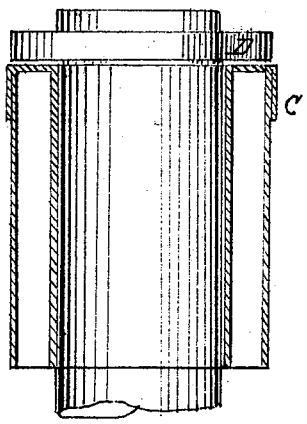
Figure 2 represents the same when finished.
Figure 4:
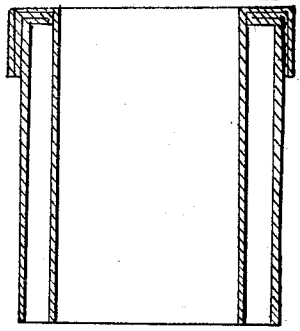
Figure 4 represents the same when finished.

In the present way of constructing India-rubber or gutta-percha hose, the edges of the canvas part are exposed to the air and water at the ends of the sections, where they are coupled together, as represented at A.

The result of this exposure is that so much water is taken up by the capillary attraction of the canvas, that the latter, for a considerable distance from the ends, is, in the case of hose used on fire-engines, nearly always wet, the conditions of the canvas and rubber being very unfavorable for drying.

Owing to the continued presence of water in the canvas, it soon rots and loses its strength, and, consequently, the hose fails at the ends, while the remaining portion is good.

Our invention consists in protecting the ends, by providing extensions B of the rubber lining, and folding them over the ends, previous to vulcanizing, as represented at C, and afterwards vulcanizing them in this condition.

For fitting the lining snugly and squarely to the ends, we employ washers, with flat faces, fitting upon the mandrels on which the hose is vulcanized, and provided with means whereby they may be forced up snugly against the ends, as shown in red at D.

We propose, also, when desired, to extend the exterior rubber coating E in a similar manner, and first fold it down over the end of the lining, as shown at F, and then fold it back, together with the lining, over the exterior, thereby obtaining greater thickness of rubber at the ends.

Instead of extending the rubber lining or exterior coating, we may take a washer of rubber or gutta-percha, and fit it up to the end of the hose, on the mandrel, in advance of the metallic washer, and hermetically cover the canvas, by the union of the said washer with the end of the hose, when vulcanized.

By this plan the canvas part of the hose is hermetically closed in from the air and water, and the exposure to rot entirely prevented.

Having thus described our invention,

What we claim as my new, and desire to secure by Letters Patent, is—

Hermetically enclosing the canvas part of India-rubber or gutta percha hose at the ends, either by folding, over the said ends, extensions of the lining or exterior covering, or by the employment of rubber or gutta-percha washers, the said enclosing parts being united in the process of vulcanizing, all substantially as specified.

The above specification of our invention signed by us, this 8th day of April, 1869.

EDWARD L. PERRY.
CHARLES MANHEIM.

Witnesses:
FRANK BLOCKLEY,
E. GREENE COLLINS.